(12) United States Patent
Namuduri

(10) Patent No.: US 7,257,947 B2
(45) Date of Patent: Aug. 21, 2007

(54) POWER STEERING SYSTEM

(75) Inventor: Chandra S. Namuduri, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 11/244,807

(22) Filed: Oct. 6, 2005

(65) Prior Publication Data
US 2006/0059905 A1 Mar. 23, 2006

Related U.S. Application Data

(63) Continuation-in-part of application No. 11/096,696, filed on Apr. 1, 2005, and a continuation-in-part of application No. 10/408,752, filed on Apr. 7, 2003, now Pat. No. 6,920,753.

(60) Provisional application No. 60/607,639, filed on Sep. 7, 2004.

(51) Int. Cl.
F16D 31/02 (2006.01)

(52) U.S. Cl. .......................................... 60/435; 60/326
(58) Field of Classification Search .................. 60/326, 60/435, 441
See application file for complete search history.

(56) References Cited

U.S. PATENT DOCUMENTS

| | | | | |
|---|---|---|---|---|
| 4,457,390 A | * | 7/1984 | Abe et al. | 180/422 |
| 5,469,947 A | * | 11/1995 | Anzai et al. | 192/21.5 |
| 6,528,110 B2 | * | 3/2003 | Szalony | 427/58 |
| 6,920,753 B2 | * | 7/2005 | Namuduri | 60/435 |

* cited by examiner

*Primary Examiner*—Michael Leslie

(57) ABSTRACT

A power steering system for a vehicle includes a hydraulic pump interconnected with a power steering gear and a fluid coupling that operatively connects a drive shaft of an engine of the vehicle with the hydraulic pump. The power steering system also includes an electronic controller operable to provide a variable control signal based on received input and a power electronic converter that energizes the fluid coupling in response to the control signal to vary torque transmitted via said fluid coupling.

18 Claims, 5 Drawing Sheets

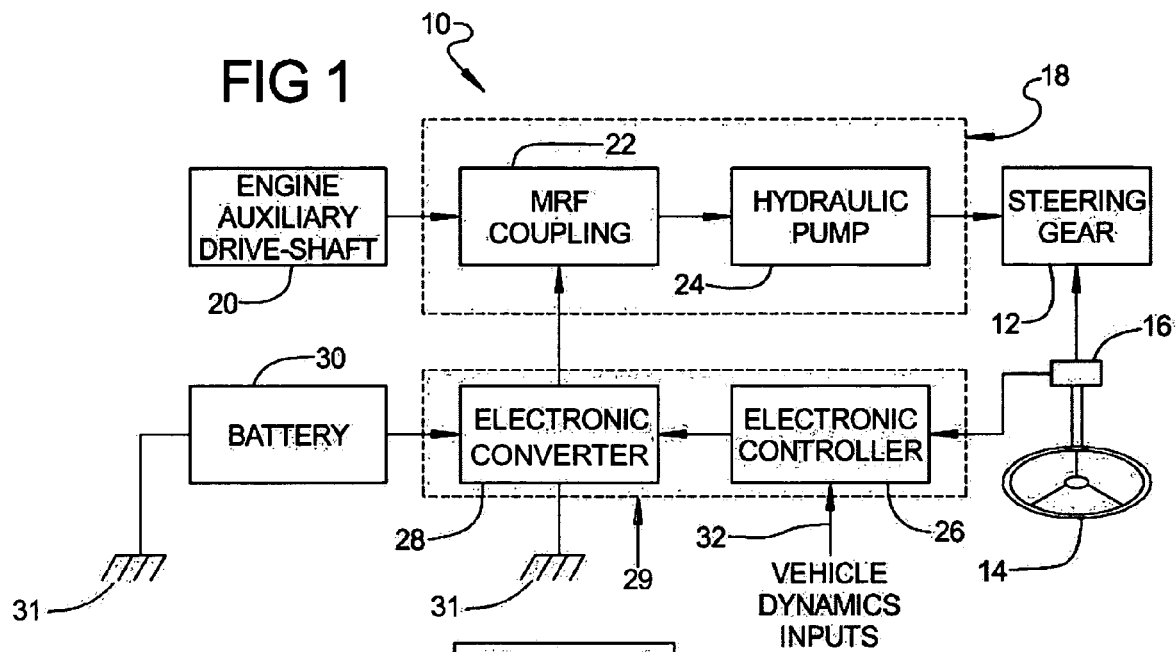
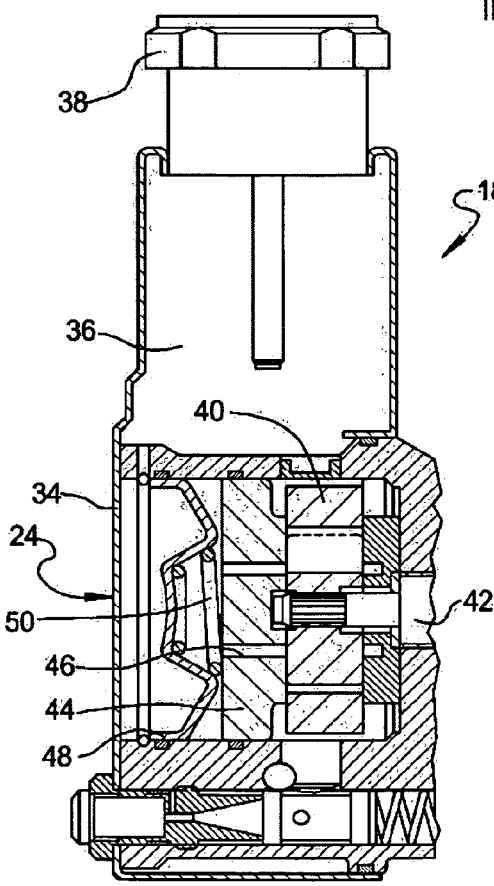

POWER STEERING SYSTEM

CROSS-REFERENCE TO RELATED APPLICATION(S)

The present application is a continuation-in-part of copending U.S. patent application Ser. No. 11/096,696, filed Apr. 1, 2005, which claims the benefit of U.S. Provisional Patent Application Ser. No. 60/607,639, filed Sep. 7, 2004 and is itself a continuation in part of U.S. patent application Ser. No. 10/408,752, filed Apr. 7, 2003 and issued Jul. 26, 2005 as U.S. Pat. No. 6,920,753.

TECHNICAL FIELD

The present invention relates generally to power steering systems for vehicles and, more particularly, to a magneto-rheological hydraulic power steering system for a vehicle.

BACKGROUND OF THE INVENTION

It is known to provide a power steering system for a vehicle such as a motor vehicle to assist a driver in steering the motor vehicle. Typically, the power steering system is of a hydraulic type. The hydraulic power steering system employs an engine driven hydraulic power steering pump for generating pressurized fluid that is coupled to a hydraulic steering gear of the motor vehicle. Since the power steering pump is driven directly by the engine using a belt, its speed is determined by that of the engine and it operates continuously as long as the engine is running, resulting in continuous losses due to constant circulation of the hydraulic fluid through the steering gear. This results in increased fuel consumption due to continuous operation of the power steering pump at speeds dictated by the engine speed, even when no steering assist is required. In addition, the power steering pump has to provide the required flow and pressure for the worst-case engine speed, which could be near idle, under static steering conditions, contributing to significant fuel consumption. This results in much higher pump flow at higher engine speeds further increasing the losses in the hydraulic power steering system, which results ultimately in increased fuel consumption.

More recently, electrohydraulic power steering systems have been used to decouple the power steering pump form the engine and provide an on-demand hydraulic pressure using an electric motor to drive the hydraulic power steering pump. An example of such an electrohydraulic power steering system incorporates a hydraulic power steering pump driven by a brushless direct current electric motor controlled by a pulse width modulated inverter. Also, there are electrically driven steering systems without using any hydraulic fluids. Both of them improve the vehicle fuel economy by providing an on-demand steering power assist and minimizing/eliminating parasitic losses associated with the engine-driven hydraulic pump. However, the electrohydraulic power steering system needs a costly high power electric motor, power electronics for controlling speed of the electric motor, and a reliable electrical power supply (including an engine driven alternator and battery). The overall losses of the conventional electrohydraulic power steering system include losses through the engine alternator, power electronics, electric motor, and power steering pump.

As a result, it is desirable to provide a power steering system for a vehicle that minimizes power losses in a power steering pump and provides variable flow and pressure of the pump independent of engine speed. It is also desirable to provide a power steering system for a vehicle that controls pressure of the steering system using a power steering pump. It is further desirable to provide a power steering system that provides variable power steering assist at a relatively low cost. Therefore, there is a need in the art to provide a power steering system that meets these desires.

SUMMARY OF THE INVENTION

It is, therefore, one aspect of the present invention to provide a power steering system for a vehicle.

In another aspect of the present invention, a hydraulic power steering system is provided that minimizes power losses in a power steering pump and controls pressure of the steering system using the same.

To achieve the foregoing objectives, a power steering system is provided for a vehicle including a power steering gear and a hydraulic pump connected with the power steering gear. Furthermore, a fluid coupling, which may be a magneto-rheological fluid coupling, operatively connects a drive shaft of an engine of the vehicle with the hydraulic pump. The power steering system further includes a controller operable to provide a variable control signal based on received input. A power electronic converter is provided to receive the variable control signal and to energize the fluid coupling in response to the variable control signal to vary torque transmitted via the fluid coupling.

One advantage of the present invention is that a power steering system is provided for a vehicle. Another advantage of the present invention is that the power steering system adopts direct control of the speed of the hydraulic power steering pump by using a fluid coupling integrated between the accessory drive shaft and the hydraulic power steering pump. Yet another advantage of the present invention is that the power steering system provides continuously adjustable speed by controlling the torque transmitted from the drive shaft to that of the power steering pump. Still another advantage of the present invention is that the power steering system improves vehicle fuel efficiency due to elimination of losses resulting from double energy conversion in a conventional electro-hydraulic power steering system.

A further advantage of the present invention is that, in one embodiment, the power steering system reduces cost due to a relatively simple low current controller replacing the costly high-current power-electronics of a conventional electro-hydraulic power steering system. Yet a further advantage of the present invention is that the power steering system provides variable power steering assist by controlling the speed of the hydraulic pump. Still a further advantage of the present invention is that the power steering system may have reduced mass due to the elimination of an electric motor and high current power electronics as in electro-hydraulic power steering systems.

Another advantage of the present invention is that the power steering system improves reliability due to reduced number of components and less stress on the mechanical parts of the hydraulic pump. A further advantage of the present invention is that the power steering system enables fuel economy enhancement by reducing the power steering pump torque to a minimum when steering assist is not required and offers speed variable effort at no additional cost. Still a further advantage of the present invention is that the power steering system also enhances the life of the pump as it is working with less torque for more than 90% of the time when power assist is not needed.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a diagrammatic view of a power steering system, according to the present invention.

FIG. 2 is a fragmentary elevational view of a hydraulic pump of the power steering system of FIG. 1.

DESCRIPTION OF THE PREFERRED EMBODIMENT(S)

Figure 3:
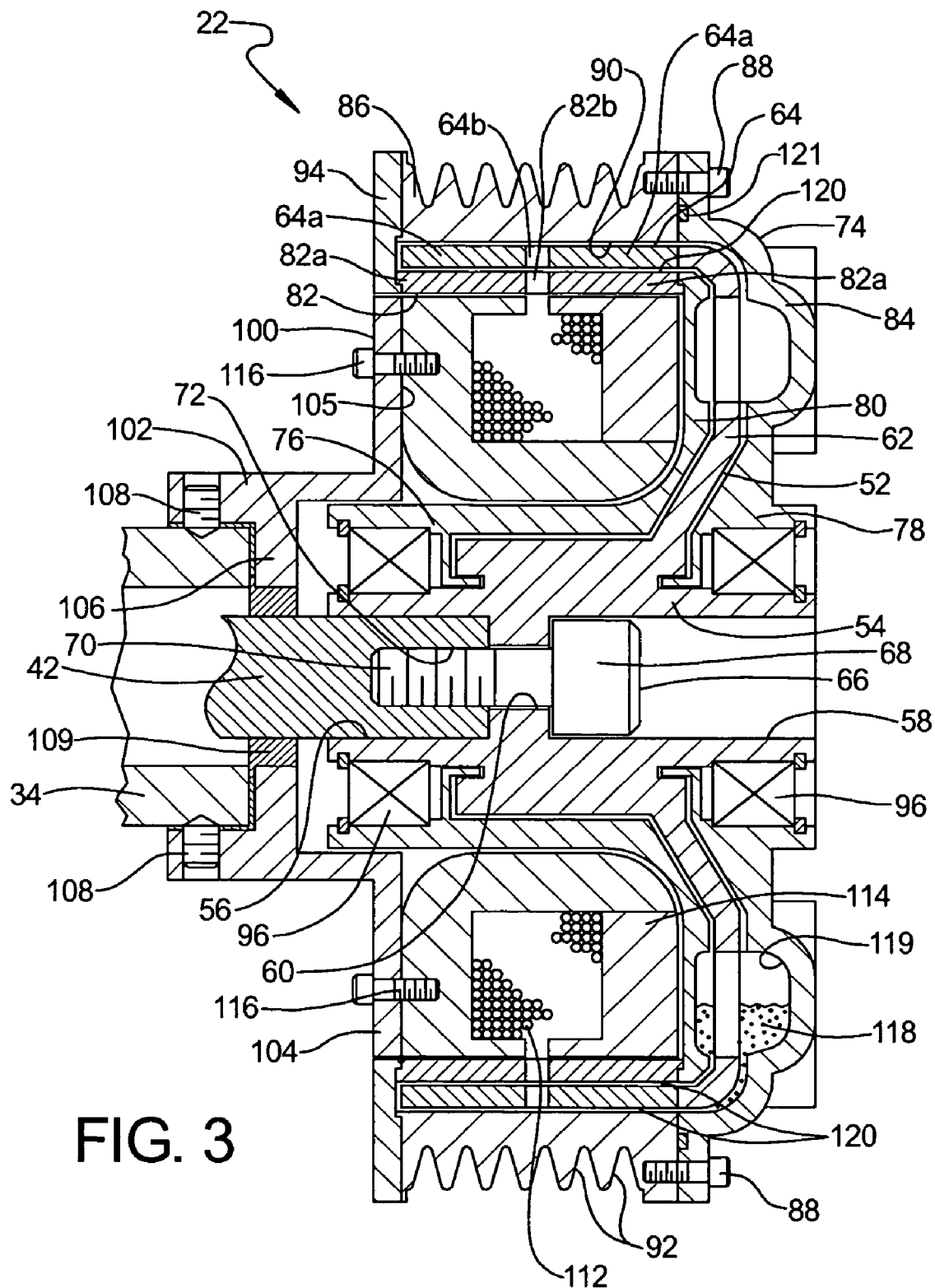
FIG. 3 is a fragmentary elevational view of a magneto-rheological fluid coupling, according to the present invention, of the power steering system of FIG. 1.

Referring to the drawings and in particular FIG. 1, one embodiment of a power steering system according to the present invention is a magneto-rheological hydraulic power steering system 10 for a vehicle (not shown) such as a motor vehicle or automotive vehicle. The magneto-rheological hydraulic power steering system 10 includes a steering gear 12 and a steering wheel 14 operatively connected to the steering gear 12. The magneto-rheological hydraulic power steering system 10 also includes at least one steering wheel sensor 16 operatively connected to the steering wheel 14 to sense angle and/or torque of the steering wheel 14. It should be appreciated that the steering gear 12, steering wheel 14, and steering wheel sensor 16 are conventional and known in the art.

The magneto-rheological hydraulic power steering system 10 includes a power steering pump assembly, generally indicated at 18, operatively connected to the power steering gear 12 and an output member such as an auxiliary or accessory drive shaft 20 of an engine (not shown) of the vehicle. The power steering pump assembly 18 may be directly connected with the engine drive shaft 20 or may be connected thereto via a belt drive. The power steering pump assembly 18 includes a magneto-rheological fluid coupling or clutch 22 and a hydraulic pump 24 to be described. It should be appreciated that the magneto-rheological fluid coupling 22 and the hydraulic pump 24 may either be integrated as a module such as the pump assembly 18, referred to herein as a magneto-electrohydraulic pump, or the fluid coupling 22 may be a separate unit, remote from the hydraulic pump 24. For example, it may be integrated with the drive shaft 20. The magneto-rheological fluid coupling 22 is used to directly control the speed of the hydraulic pump 24 by providing a continuously adjustable speed by controlling the torque transmitted from the drive shaft 20 to that of the hydraulic pump 24.

The magneto-rheological hydraulic power steering system 10 also includes an electronic controller 26 electrically connected to the steering wheel sensor 16. The electronic controller 26 includes a central processing unit (CPU), algorithm and memory, and a vehicle and sensor interface (not shown). The magneto-rheological hydraulic power steering system 10 also includes a power electronic converter 28 electrically connected to the magneto-rheological fluid coupling 22 and the electronic controller 26. The electronic controller 26 and the power electronic converter 28 may be integrated within an electronic control module 29 or may be separate units. The power electronic converter 28 is electrically connected to a source of electrical power 30 such as a vehicle battery and is electrically connected to a ground 31 such as a vehicle frame for return current path. It should be appreciated that the controller 26 may also include a communication bus (not shown) interconnecting the CPU, memory, interface, and power electronic converter 28. The power electronic converter 28 may be any device that provides a controlled electronic output to the magneto-rheological fluid coupling 22 in response to a control signal received from the controller 26, including a current amplifier to provide a controlled current level, a voltage amplifier to provide a controlled voltage level and an output current driver such as a pulse width modulation (PWM) device. The pulse width modulation device provides a pulsatile waveform that has an effective voltage lower than the input voltage.

The controller 26 receives information from at least one, preferably a plurality of inputs 32 such as vehicle dynamic inputs from other vehicle sensors (not shown) and vehicle controllers (not shown) such as vehicle speed, wheel speed, yaw rate, lateral acceleration, side slip angle, road surface condition or type, and other vehicle dynamics related data via the communication bus or through individual signal lines. The controller 26 controls at least one output from the power electronic converter 28 to the magneto-rheological fluid coupling 22 to control the current or voltage through a coil 112 (shown in FIG. 3) of the magneto-rheological fluid coupling 22. It should be appreciated that the controller 26 is used to interface the steering wheel sensors 16 (steering wheel angle, steering wheel torque, etc.) and vehicle dynamic sensors (speed, brake pedal position, etc.) to generate a current or voltage signal to the coil 112 in the magneto-rheological fluid coupling 22 to control the speed of the hydraulic pump 24. It should also be appreciated that the magneto-rheological hydraulic power steering system 10 may include an integrated speed sensor (not shown) within the hydraulic pump 24 and/or a pressure sensor (not shown) or flow sensor (not shown) in the hydraulic lines (not shown) to provide additional control information to the electronic controller 26 for adjusting the current or voltage to the coil 112 (FIG. 3) of the magneto-rheological fluid coupling 22.

Referring to FIG. 2, the magneto-electrohydraulic power steering pump assembly 18 is shown. As illustrated, the magneto-electrohydraulic power steering pump assembly 18 includes the magneto-rheological fluid clutch 22 and hydraulic pump 24 integrated as a single unit. The hydraulic pump 24 includes a housing 34 forming a fluid reservoir 36 at an upper end thereof. The hydraulic pump 24 has a removable cap 38 closing the opening of the reservoir 36. The hydraulic pump 24 also includes a vane pump member 40 disposed within the housing and a pump shaft 42 having one end connected to the vane pump member 40 and the other end connected to the magneto-rheological fluid coupling 22. The hydraulic pump 24 also includes a support member 44 disposed in the housing 34 adjacent the vane pump member 40 and have fluid passages 46 extending therethrough. The hydraulic pump 24 includes a return member 48 disposed in the housing 34 adjacent the support member 44 and a return spring 50 disposed between the support member 44 and return member 48. It should be appreciated that, except for the pump shaft 42, the hydraulic pump 24 is conventional and known in the art. It should also be appreciated that the magneto-rheological fluid coupling 22 and hydraulic pump 24 may be integrated as a single unit.

Referring to FIG. 3, the magneto-rheological fluid coupling 22 includes an inner rotor 52 disposed about a portion of the pump shaft 42. The inner rotor 52 has a base portion 54 extending axially. The base portion 54 has a first cavity 56 extending axially inward and a second cavity 58 extending axially outward opposite to the first cavity 56. The base portion 54 has an aperture 60 extending axially therethrough and communicating with the first cavity 56 and the second cavity 58. The first cavity 56 receives the pump shaft 42 and the second cavity 58 receives a fastener 66 to be described. It should be appreciated that the pump shaft 42 is secured in the first cavity 56 by a suitable mechanism such as press-fitting.

The inner rotor 52 also has an arm portion 62 extending radially from the base portion 54 and a flange portion 64 extending axially from the arm portion 62. The flange portion 64 has two outer rings 64a and a separator ring 64b disposed axially between the outer rings 64a. The outer rings 64a and separator ring 64b are annular and generally circular in shape. The inner rotor 52 is made of primarily non-magnetic materials such as stainless steel, aluminum, or other suitable materials. The outer rings 64a are made of magnetically permeable materials such as low carbon steel, powdered iron, or other suitable iron alloys. In one embodiment, the separator ring 64b may be made of a non-magnetic material such as stainless steel, aluminum, or other suitable material. In another embodiment, the separator ring 64b may be made of a magnetic material that provides a low permeability region between the outer rings 64a. The inner rotor 52 is made into an integral one-piece structure by joining all the parts by a suitable mechanism such as brazing, welding, or other suitable joining mechanism.

The magneto-rheological fluid coupling 22 includes a fastener 66 such as a socket-head screw to fasten the pump shaft 42 to the inner rotor 52. The output shaft 66 has a head 68 extending radially outwardly and a threaded shaft 70 extending axially outwardly from the head 68. The head 68 is disposed in the second cavity 58 and the shaft 70 extends axially through the aperture 60 in the inner rotor 52 and into the first cavity 56 to threadably engage a threaded aperture 72 of the pump shaft 42. It should be appreciated that the inner rotor 52, fastener 66, and pump shaft 42 rotate together as a single unit.

The magneto-rheological fluid coupling 22 includes an outer rotor 74 spaced axially and radially from the inner rotor 52. The outer rotor 74 has a first base portion 76 extending axially and a second base portion 78 extending axially and spaced from the first base portion 76. The outer rotor 74 has a first arm portion 80 extending radially from the first base portion 76 and a first flange portion 82 extending axially from the first arm portion 80.

The first flange portion 82 has two outer rings 82a and a separator ring 82b disposed axially between the outer rings 82a. The outer rings 82a and separator ring 82b are annular and generally circular in shape. The outer rings 82a are made of magnetically permeable materials such as low carbon steel, powdered iron, or other suitable iron alloys. In one embodiment, the separator ring 82b may be made of a non-magnetic material such as stainless steel, aluminum, or other suitable material. In another embodiment, the separator ring 82b may be made of a magnetic material that provides a low permeability region between the outer rings 82a. The first flange portion 82 is made into an integral structure by joining all the rings by a suitable mechanism such as brazing, welding, or other suitable joining mechanism.

The outer rotor 74 has a second arm portion 84 extending radially from the second base portion 78. The outer rotor 74 also has a second flange portion 86 extending axially and connected to the second arm portion 84 by a suitable mechanism such as at least one, preferably a plurality of fasteners 88. The second flange portion 86 is spaced radially from the first flange portion 82 to form a space 90 therebetween to receive the flange portion 64 of the inner rotor 52. The second flange portion 86 of the outer rotor 74 has at least one, preferably a plurality of grooves 92 to form the pulley that receives a ribbed drive belt (not shown) connected to an engine pulley (not shown). The second flange portion 86 is made of magnetically permeable materials such as low carbon steel, powdered iron, or other suitable iron alloys.

The outer rotor 74 has a connecting portion 94 extending radially and interconnecting the flange portions 82 and 86 of the outer rotor 74. The connecting portion 94 is made of a non-magnetic material such as stainless steel, aluminum, or other suitable material. The connecting portion 94 is made into an integral structure by joining the flange portions 82 and 86 and the connecting portion 94 together by a suitable mechanism such as brazing, welding, or other suitable joining mechanism. The outer rotor 74 is made of primarily non-magnetic materials such as stainless steel, aluminum, or other suitable materials, except for the outer rings 82a and flange portion 86. The outer rotor 74 is a monolithic structure being integral, unitary, and one-piece. It should be appreciated that the inner rotor 52 and outer rotor 74 have non-magnetic ends that hold the inner and outer concentric shells of the inner rotor 52 and outer rotor 74, respectively.

The magneto-rheological fluid coupling 22 includes at least one, preferably a plurality of bearings 96 spaced axially and disposed between the base portion 54 of the inner rotor 52 and the base portions 76 and 78 of the outer rotor 74. The bearings 96 are of a sealed roller type to allow rotation of the outer rotor 74 relative to the inner rotor 52. It should be appreciated that the inner rotor 52 and outer rotor 74 are held concentric to the pump shaft 42 by the bearings 96. It should also be appreciated that the bearings 96 are secured to the inner rotor 52 by a suitable mechanism such as press-fitting.

The magneto-rheological fluid coupling 22 includes a support member such as a bracket 100. The bracket 100 is generally annular and has a generally "L" cross-sectional shape. The bracket 100 has a base portion 102 extending axially and an arm portion 104 extending radially from one end of the base portion 102. The arm portion 104 cooperates with the first base portion 76, first arm portion 80, and first flange portion 82 to form a cavity 105 for a function to be described. The bracket 100 has a projection portion 106 extending radially inward from the base portion 102. The base portion 102 is secured or fixed to the pump housing 34 of the hydraulic pump 24 by a suitable mechanism such as at least one, preferably a plurality of fasteners 108. The bracket 100 is made of a non-magnetic material such as stainless steel or aluminum. It should be appreciated that, in this embodiment, the bracket 100 is fixed to the pump housing 34 and does not move.

The magneto-rheological fluid coupling 22 also includes a bushing 109 to guide the bracket 100 about the pump shaft 42. The bushing 109 is generally annular and circular in shape. The bushing 109 is disposed about the pump shaft 42 and radially between the projection portion 106 and the pump shaft 42. The bushing 109 is made of a low friction material such as Teflon®. It should be appreciated that the bushing 110 locates the bracket 100 relative to the pump shaft 42 and allows the bracket 100 to ride thereon.

The magneto-rheological fluid coupling 22 also includes a stationary coil 112 disposed within the cavity 105. The magneto-rheological fluid coupling 22 also includes a magnetically permeable core 114 disposed within the cavity 105 about the coil 112 such that the coil 112 is embedded therein. The core 114 is made of a material such as low carbon steel, powdered iron, or other suitable magnetic materials. The core 114 is secured to the bracket 100 by a suitable mechanism such as at least one, preferably a plurality of fasteners 116. The coil 112 is connected by a suitable mechanism such as wires (not shown) to the power electronic converter 28. It should be appreciated that the core 114 surrounding the coil 112 is held concentric to the pump shaft 42 by the bracket 100. It should also be appreciated that, in this embodiment, the core 114 and coil 112 are fixed and do not rotate.

The magneto-rheological fluid coupling 22 further includes a magneto-rheological (MR) fluid 118 disposed in the two gaps 120 formed in the space 90 between the outer rotor 74 and the inner rotor 52. The MR fluid 118 contains magnetizable particles such as carbonyl iron spheroids of about one half (½) to twenty-five (25) microns in diameter dispersed in a viscous fluid such as silicone oil or synthetic hydrocarbon oil which has a viscosity of between about 20 and 50,000 mPa. The MR fluid 118 may collect in a recess 119 of the outer rotor 74 or a recess (not shown) in the base portion 54 of the inner rotor 52. The MR fluid 118 travels from the recesses into and fills channels or gaps 120 between the inner rotor 52 and outer rotor 74 in the space 90. It should also be appreciated that the MR fluid 118 may also contain surfactants, flow modifiers, lubricants, viscosity enhancers, and other additives. It should also be appreciated that the MR fluid 118 is conventional and known in the art.

The magneto-rheological fluid coupling 22 includes a seal 121 disposed between the flange portion 86 and arm portion 84 of the outer rotor 74. The seal 121 is made of an elastomeric material. The seal 121 is annular and has a generally circular cross-sectional shape. The seal 121 prevents the MR fluid 118 from leaking out of the gaps 120.

In operation of the magneto-rheological hydraulic power steering system 10, the electronic controller 26 adjusts the current of the coil 112 of the magneto-rheological fluid coupling 22 based on an algorithm, which is programmed into the memory of the controller 26. The control algorithm for adjusting the current to the coil 112 of the fluid coupling 22 utilizes all or some of the information from the inputs 32 and the steering wheel sensor 16. The electronic controller 26 sends a signal to the fluid coupling 22 through the power electronic converter 28 to pass a current through the coil 112 to generate a magnetic field across the MR fluid 118 between the outer rotor 74 and the inner rotor 52.

When current is applied to the coil 112, the flux of the magnetic field travels through the core 114, outer rings 64a and 82a, gaps 120, and second flange portion 86 and returns across the gaps 120, outer rings 64a and 82a, and to the core 114. The torque transferred from the outer rotor 74 to the inner rotor 52 is controlled by the magnetic flux density established in the MR fluid 118. The strength of the magnetic field increases or decreases the yield stress and apparent viscosity of the MR fluid 118 and thus increases or decreases the torque transmitted and thereby enhances speed of the hydraulic pump 24. The yield stress and apparent viscosity of the MR fluid 118 determines the amount of rotation of the pump shaft 42 and vane pump member 40, thus varying the speed of the hydraulic pump 24. It should be appreciated that the amount of current (or voltage) passed through the coil 112 is controllable by the electronic controller 26, thus affecting the strength of the magnetic field within and yield stress and apparent viscosity of the MR fluid 118. It should also be appreciated that the dual gap geometry of the fluid coupling 22 is especially suited to reduce the axial length of the coupling 22 so as to minimize the cantilever load on the power steering pump shaft 42. It should further be appreciated that, in the embodiment illustrated, the stationary coil 112 eliminates slip rings and isolates the coil 112 from the heat generated within the MR fluid 118 due to slip between the inner and outer rotors 52 and 74. It should still further be appreciated that a suitable heat sink with suitable fins can be integral or attached to the outer rotor 84 in order to maximize cooling of the MR fluid 118 and the fluid coupling 22 during operation. It should be appreciated that the size and shape of such a heat sink is determined by the cooling requirements calculated by those skilled in the art.

Figure 4:
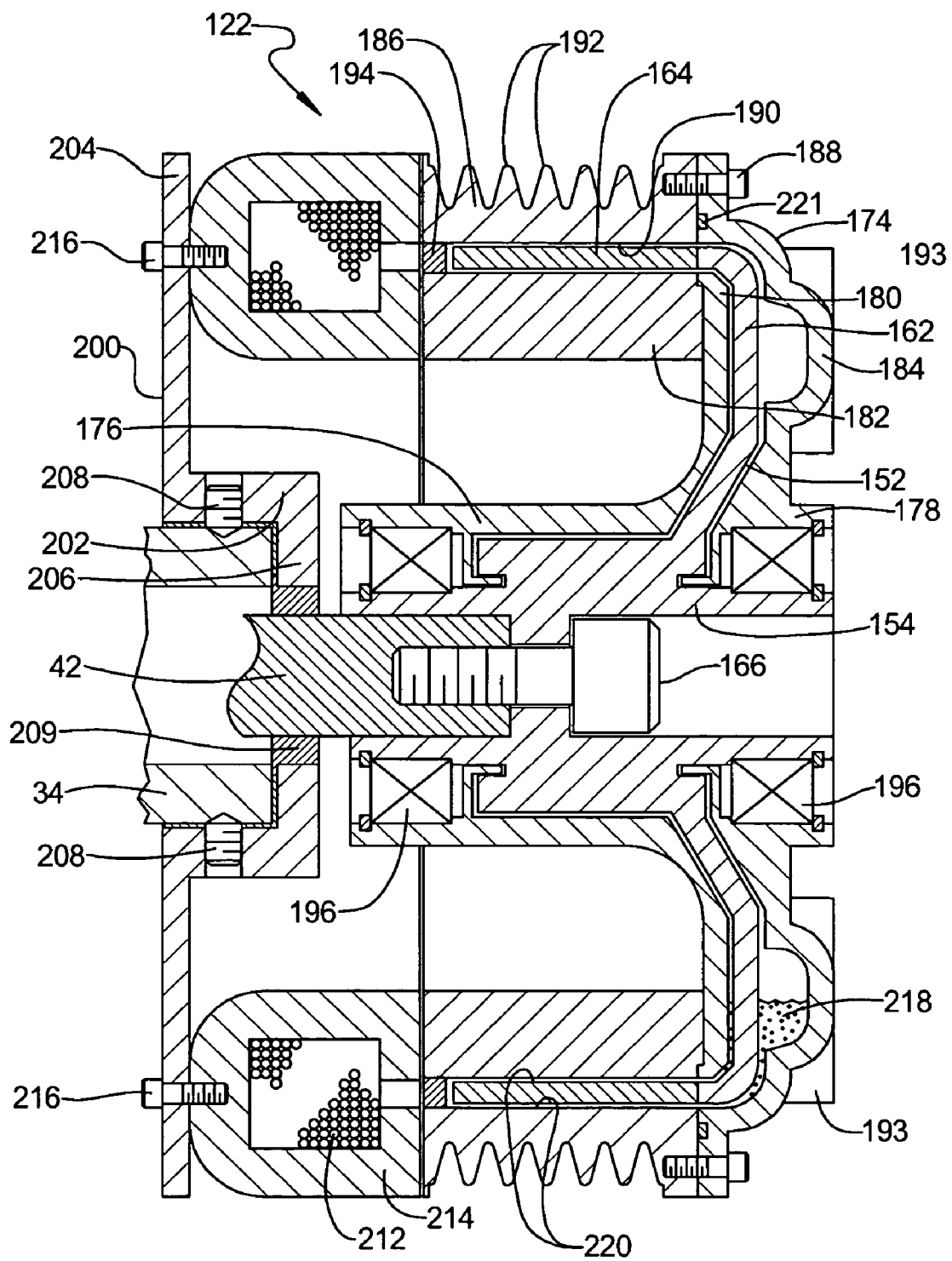
FIG. 4 is a fragmentary elevational view of another embodiment, according to the present invention, of the magneto-rheological fluid coupling of FIG. 3 for the power steering system of FIG. 1.

Referring to FIG. 4, another embodiment, according to the present invention, of the magneto-rheological fluid coupling 22 for the magneto-rheological hydraulic power steering system 10 is shown. Like parts of the magneto-rheological fluid coupling 22 have like reference numerals increased by one hundred (100). In this embodiment, the magneto-rheological fluid coupling 122 includes the inner rotor 152 disposed about a portion of the pump shaft 42. The inner rotor 152 has a base portion 154 extending axially. The inner rotor 152 also has an arm portion 162 extending radially from the base portion 154 and a flange portion 164 extending axially from the arm portion 162. The inner rotor 152 is made of primarily non-magnetic materials such as stainless steel, aluminum, or other suitable materials. The flange portion 164 is made of magnetically permeable materials such as low carbon steel, powdered iron, or other suitable iron alloys. The inner rotor 152 is made into an integral one-piece structure by joining all the parts by a suitable mechanism such as brazing, welding, or other suitable joining mechanism.

The magneto-rheological fluid coupling 122 also includes a fastener 166 such as a socket-head screw to fasten the pump shaft 42 to the inner rotor 152. The magneto-rheological fluid coupling 122 includes an outer rotor 174 spaced axially and radially from the inner rotor 152. The outer rotor 174 has a first base portion 176 extending axially and a second base portion 178 extending axially and spaced from the first base portion 176. The outer rotor 174 has a first arm portion 180 extending radially from the first base portion 176 and a first flange portion 182 extending axially from the first arm portion 180. The first flange portion 182 is made of magnetically permeable materials such as low carbon steel, powdered iron, or other suitable iron alloys.

The outer rotor 174 has a second arm portion 184 extending radially from the second base portion 178. The outer rotor 174 also has a second flange portion 186 extending axially and connected to the second arm portion 184 by a suitable mechanism such as at least one, preferably a plurality of fasteners 188. The second flange portion 186 is made of magnetically permeable materials such as low carbon steel, powdered iron, or other suitable iron alloys. The second flange portion 186 is spaced radially from the first flange portion 182 to form a space 190 therebetween to receive the flange portion 164 of the inner rotor 152. The second flange portion 186 of the outer rotor 174 has at least one, preferably a plurality of grooves 192 to form the pulley that receives a ribbed drive belt (not shown) connected to an engine pulley (not shown). It should be appreciated that the outer rotor 174 may include at least one, preferably a plurality of heat dissipation fins 193 integral with or attached to the second arm portion 184 thereof by a suitable mechanism such as brazing, welding, or other suitable joining mechanism.

The outer rotor 174 has a connecting portion 194 extending radially and interconnecting the flange portions 182 and 186 of the outer rotor 174. The connecting portion 194 is made of a non-magnetic material such as stainless steel, aluminum, or other suitable material. The connecting portion 194 is made into an integral structure by joining the flange portions 182 and 186 and the connecting portion 194 together by a suitable mechanism such as brazing, welding, or other suitable joining mechanism. The outer rotor 174 is made of primarily non-magnetic materials such as stainless steel, aluminum, or other suitable materials, except for the first flange portion 182 and second flange portion 186. The outer rotor 174 is a monolithic structure being integral, unitary, and one-piece.

The magneto-rheological fluid coupling 122 includes at least one, preferably a plurality of bearings 196 spaced axially and disposed between the base portion 154 of the inner rotor 152 and the base portions 176 and 178 of the outer rotor 174. The magneto-rheological fluid coupling 122 includes a support member such as a bracket 200. The bracket 200 has a base portion 202 extending axially and an arm portion 204 extending radially from one end of the base portion 202. The bracket 200 has a projection portion 206 extending radially inward from the base portion 202. The base portion 202 is secured or fixed to the pump housing 34 of the hydraulic pump 24 by a suitable mechanism such as at least one, preferably a plurality of fasteners 208. It should be appreciated that, in this embodiment, the bracket 200 is fixed to the pump housing 34 and does not move.

The magneto-rheological fluid coupling 122 also includes a bushing 209 to guide the bracket 200 about the pump shaft 42. The bushing 209 is disposed about the pump shaft 42 and radially between the projection portion 206 and the pump shaft 42.

The magneto-rheological fluid coupling 122 also includes a stationary coil 212 and a magnetically permeable core 214 disposed about the coil 212 such that the coil 212 is embedded therein. The core 214 is secured to the arm portion 204 of the bracket 200 by a suitable mechanism such as at least one, preferably a plurality of fasteners 216. The coil 212 is connected by a suitable mechanism such as wires (not shown) to the power electronic converter 28. It should be appreciated that, in the embodiment illustrated, the coil 212 and core 214 are arranged axially. It should also be appreciated that, in this embodiment, the core 214 and coil 212 are fixed and do not rotate.

The magneto-rheological fluid coupling 122 further includes a magneto-rheological (MR) fluid 218 disposed in the two gaps 220 formed in the space 190 between the outer rotor 174 and the inner rotor 152. The magneto-rheological fluid coupling 122 includes a seal 221 disposed between the flange portion 186 and arm portion 184 of the outer rotor 174. The operation of the magneto-rheological fluid coupling 122 is similar to the magneto-rheological fluid coupling 22. It should be appreciated that, in the embodiment illustrated, the axial layout of the magneto-rheological fluid coupling 122 allows for additional flexibility in packaging.

Figure 5:
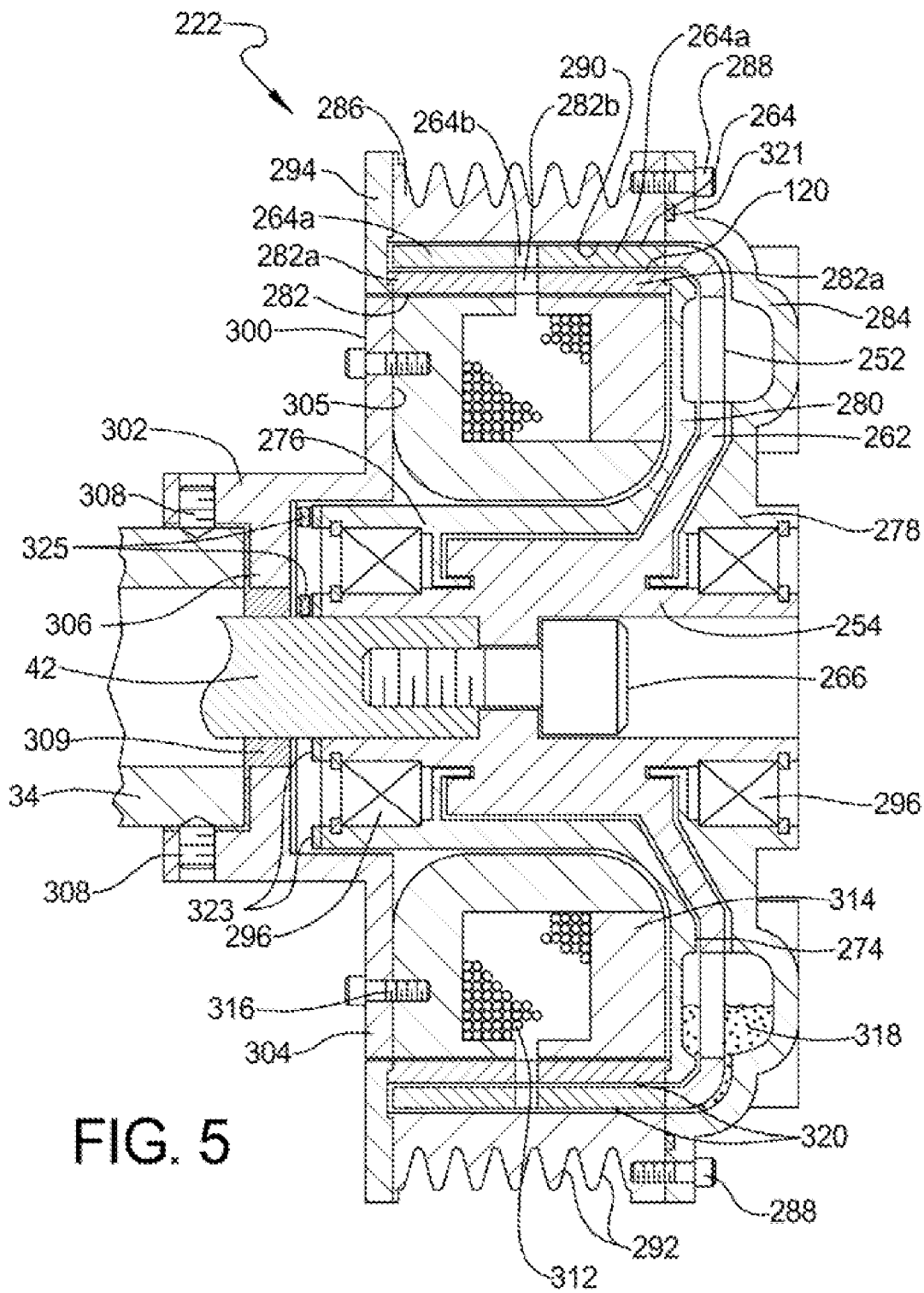
FIG. 5 is a fragmentary elevational view of yet another embodiment, according to the present invention, of the magneto-rheological fluid coupling of FIG. 3 for the power steering system of FIG. 1.

Referring to FIG. 5, yet another embodiment, according to the present invention, of the magneto-rheological fluid coupling 22 for the magneto-rheological hydraulic power steering system 10 is shown. Like parts of the magneto-rheological fluid coupling 22 have like reference numerals increased by two hundred (200). In this embodiment, the magneto-rheological fluid coupling 222 includes an inner rotor 252 disposed about a portion of the pump shaft 42. The inner rotor 252 has a base portion 254 extending axially. The inner rotor 252 also has an arm portion 262 extending radially from the base portion 254 and a flange portion 264 extending axially from the arm portion 262. The flange portion 264 has two outer rings 264a and a separator ring 264b disposed axially between the outer rings 264a. The outer rings 264a and separator ring 264b are annular and generally circular in shape. The inner rotor 252 is made of primarily non-magnetic materials such as stainless steel, aluminum, or other suitable materials. The outer rings 264a are made of magnetically permeable materials such as low carbon steel, powdered iron, or other suitable iron alloys. The separator ring 264b is made of a non-magnetic material such as stainless steel, aluminum, or other suitable material. The inner rotor 252 is made into an integral one-piece structure by joining all the parts by a suitable mechanism such as brazing, welding, or other suitable joining mechanism.

The magneto-rheological fluid coupling 222 includes a fastener 266 such as a socket-head screw to fasten the pump shaft 42 to the inner rotor 252. The magneto-rheological fluid coupling 222 includes an outer rotor 274 spaced axially and radially from the inner rotor 252. The outer rotor 274 has a first base portion 276 extending axially and a second base portion 278 extending axially and spaced from the first base portion 276. The outer rotor 274 has a first arm portion 280 extending radially from the first base portion 276 and a first flange portion 282 extending axially from the first arm portion 280.

The first flange portion 282 has two outer rings 282a and a separator ring 282b disposed axially between the outer rings 282a. The outer rings 282a and separator ring 282b are annular and generally circular in shape. The outer rings 282a are made of magnetically permeable materials such as low carbon steel, powdered iron, or other suitable iron alloys. The separator ring 282b is made of a non-magnetic material such as stainless steel, aluminum, or other suitable material. The first flange portion 282 is made into an integral structure by joining all the rings by a suitable mechanism such as brazing, welding, or other suitable joining mechanism.

The outer rotor 274 has a second arm portion 284 extending radially from the second base portion 278. The outer rotor 274 also has a second flange portion 286 extending axially and connected to the second arm portion 284 by a suitable mechanism such as at least one, preferably a plurality of fasteners 288. The second flange portion 286 is spaced radially from the first flange portion 282 to form a space 290 therebetween to receive the flange portion 264 of the inner rotor 252. The second flange portion 286 of the outer rotor 274 has at least one, preferably a plurality of grooves 292 to form the pulley that receives a ribbed drive belt (not shown) connected to an engine pulley (not shown). The second flange portion 286 is made of magnetically permeable materials such as low carbon steel, powdered iron, or other suitable iron alloys.

The outer rotor 274 has a connecting portion 294 extending radially and interconnecting the flange portions 282 and 286 of the outer rotor 274. The connecting portion 294 is made of a non-magnetic material such as stainless steel, aluminum, or other suitable material. The connecting portion 294 is made into an integral structure by joining the flange portions 282 and 286 and the connecting portion 294 together by a suitable mechanism such as brazing, welding, or other suitable joining mechanism.

The magneto-rheological fluid coupling 222 includes at least one, preferably a plurality of bearings 296 spaced axially and disposed between the base portion 254 of the inner rotor 252 and the base portions 276 and 278 of the outer rotor 274. The magneto-rheological fluid coupling 222 includes a support member such as a bracket 300. The bracket 300 has a base portion 302 extending axially and an arm portion 304 extending radially from one end of the base portion 302. The arm portion 304 cooperates with the first base portion 276, first arm portion 280, and first flange portion 282 to form a cavity 305 for a function to be described. The bracket 300 has a projection portion 306 extending radially inward from the base portion 302. The base portion 302 is secured or fixed to the pump housing 34 of the hydraulic pump 24 by a suitable mechanism such as at least one, preferably a plurality of fasteners 308. It should be appreciated that, in this embodiment, the bracket 300 is fixed to the pump housing 34 and does not move.

The magneto-rheological fluid coupling 222 also includes a bushing 309 to guide the bracket 300 about the pump shaft 42. The bushing 309 is disposed about the pump shaft 42 and radially between the projection portion 306 and the pump shaft 42.

The magneto-rheological fluid coupling 222 also includes a stationary coil 312 disposed within the cavity 305. The magneto-rheological fluid coupling 222 also includes a magnetically permeable core 314 disposed within the cavity 305 about the coil 312 such that the coil 312 is embedded therein. The core 314 is secured to the bracket 300 by a suitable mechanism such as at least one, preferably a plurality of fasteners 316. The coil 312 is connected by a suitable mechanism such as wires (not shown) to the power electronic converter 28. It should also be appreciated that, in this embodiment, the core 314 and coil 312 are fixed and do not rotate.

The magneto-rheological fluid coupling 222 further includes a magneto-rheological (MR) fluid 318 disposed in the two gaps 320 formed in the space 290 between the outer rotor 274 and the inner rotor 252. The magneto-rheological fluid coupling 222 includes a seal 321 disposed between the flange portion 286 and arm portion 284 of the outer rotor 274.

The magneto-rheological fluid coupling 222 includes at least one, preferably a plurality of magnets 323 attached to the inner rotor 252 and the outer rotor 274. The magnets 323 are generally annular or ring shaped. The magnets 323 are spaced radially and one is attached to the end of the base portion 254 of the inner rotor 252 and another is attached to the end of the first base portion 276 of the outer rotor 274 by a suitable mechanism such as brazing, welding, or other suitable joining mechanism.

The magneto-rheological fluid coupling 222 includes at least one, preferably a plurality of Hall effect sensors 325 attached to the bracket 300 and bushing 309. The Hall effect sensors 325 are generally rectangular in shape. The Hall effect sensors 325 are spaced radially and one is located relative to the projection portion 306 of the bracket 300 and another is located relative to the bushing 309. The Hall effect sensors 325 are spaced longitudinally from the magnets 323 and are mounted on a printed circuit board (not shown) connected to the bracket 300 and bushing 309 and are potted or encapsulated and connected by electrical leads or wires (not shown) to a source of power such as the controller 26.

The operation of the magneto-rheological fluid coupling 222 is similar to the magneto-rheological fluid coupling 22. However, the magnets 323 rotate relative to the Hall effect sensors 325. This movement changes the output of the Hall effect sensors 325. The controller 26 uses the output signals for speed control and diagnostics between the inner rotor 252 and outer rotor 274 by changing the input to the coil 312 to change a viscosity of the MR fluid 318. It should be appreciated that, in the embodiment illustrated, the magneto-rheological fluid coupling 222 has a radial layout with magnet rings and speed sensors. It should also be appreciated that, in the embodiment illustrated, the magneto-rheological fluid coupling 222 has integrated permanent magnets 323 and Hall-effect sensors 325 for speed sensing.

Figure 6:
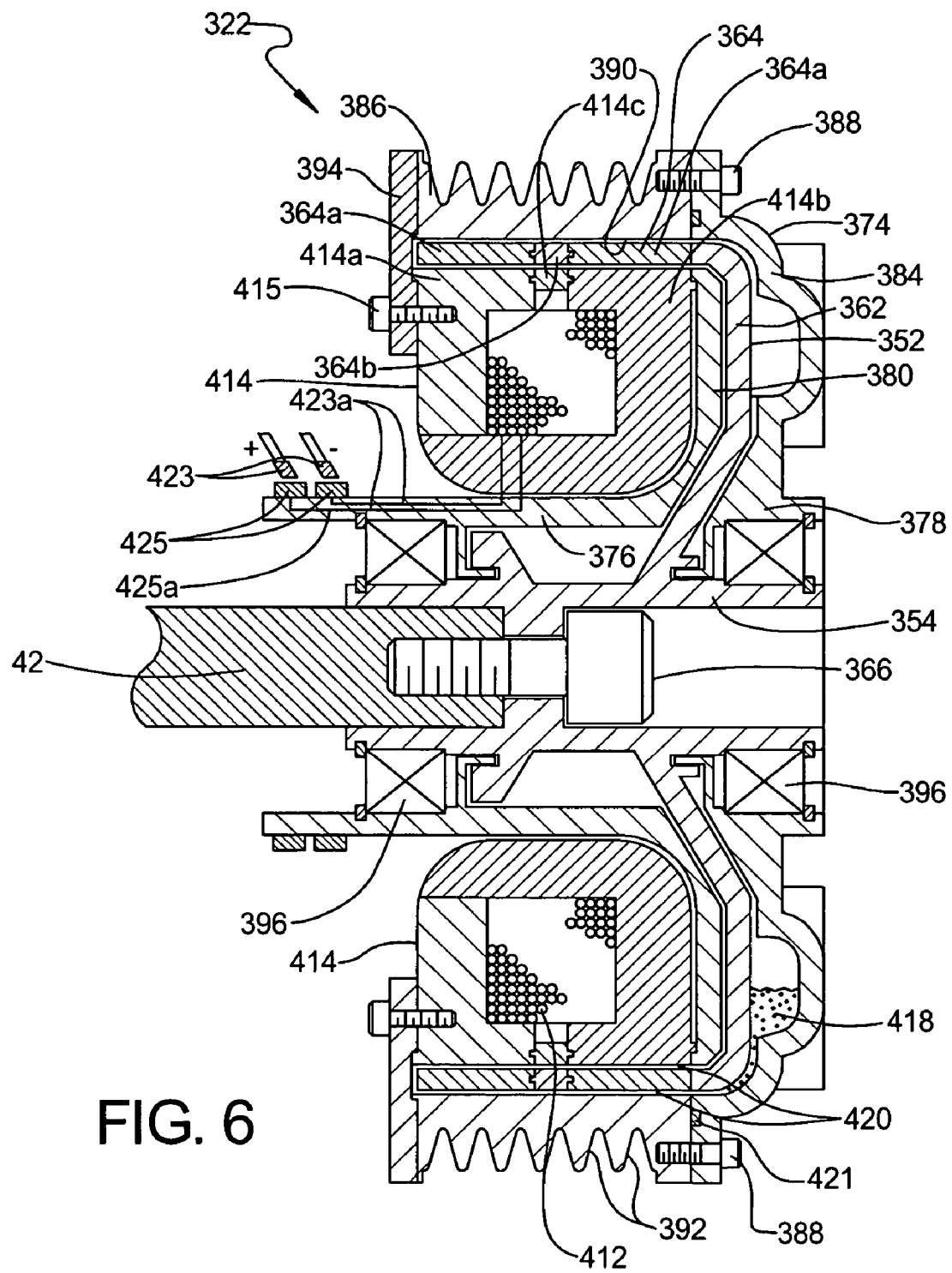
FIG. 6 is a fragmentary elevational view of still another embodiment, according to the present invention, of the magneto-rheological fluid coupling of FIG. 3 for the power steering system of FIG. 1.

Referring to FIG. 6, still another embodiment, according to the present invention, of the magneto-rheological fluid coupling 22 for the magneto-rheological hydraulic power steering system 10 is shown. Like parts of the magneto-rheological fluid coupling 22 have like reference numerals increased by three hundred (300). In this embodiment, the magneto-rheological fluid coupling 322 includes an inner rotor 352 disposed about a portion of the pump shaft 42. The inner rotor 352 has a base portion 354 extending axially. The inner rotor 352 also has an arm portion 362 extending radially from the base portion 354 and a flange portion 364 extending axially from the arm portion 362. The flange portion 364 has two outer rings 364a and a separator ring 364b disposed axially between the outer rings 364a. The outer rings 364a and separator ring 364b are annular and generally circular in shape. The inner rotor 352 is made of primarily non-magnetic materials such as stainless steel, aluminum, or other suitable materials. The outer rings 364a are made of magnetically permeable materials such as low carbon steel, powdered iron, or other suitable iron alloys. The separator ring 364b is made of a non-magnetic material such as stainless steel, aluminum, or other suitable material. The inner rotor 352 is made into an integral one-piece structure by joining all the parts by a suitable mechanism such as brazing, welding, or other suitable joining mechanism.

The magneto-rheological fluid coupling 322 includes a fastener 366 such as a socket-head screw to fasten the pump shaft 42 to the inner rotor 352. The magneto-rheological fluid coupling 322 includes an outer rotor 374 spaced axially and radially from the inner rotor 352. The outer rotor 374 has a first base portion 376 extending axially and a second base portion 378 extending axially and spaced from the first base portion 376. The outer rotor 374 has a first arm portion 380 extending radially from the first base portion 376.

The outer rotor 374 has a second arm portion 384 extending radially from the second base portion 378. The outer rotor 374 also has a flange portion 386 extending axially and connected to the second arm portion 384 by a suitable mechanism such as at least one, preferably a plurality of fasteners 388. The flange portion 386 is spaced radially from the core 414 to form a space 390 therebetween to receive the flange portion 364 of the inner rotor 352. The flange portion 386 of the outer rotor 374 has at least one, preferably a plurality of grooves 392 to form the pulley that receives a ribbed drive belt (not shown) connected to an engine pulley (not shown). The flange portion 386 is made of magnetically permeable materials such as low carbon steel, powdered iron, or other suitable iron alloys.

The outer rotor 374 has a connecting portion 394 extending radially and interconnecting the core 414 and flange portion 386 of the outer rotor 374. The connecting portion 394 is made of a non-magnetic material such as stainless steel, aluminum, or other suitable material. The connecting portion 394 is made into an integral structure by joining the flange portion 386 and the connecting portion 394 together by a suitable mechanism such as brazing, welding, or other suitable joining mechanism. The outer rotor 374 is a monolithic structure being integral, unitary, and one-piece.

The magneto-rheological fluid coupling 322 includes at least one, preferably a plurality of bearings 396 spaced axially and disposed between the base portion 354 of the inner rotor 352 and the base portions 376 and 378 of the outer rotor 374. The magneto-rheological fluid coupling 322 also includes a rotating coil 412 and a magnetically permeable core 414 disposed about the coil 412 such that the coil 412 is embedded therein. The core 414 has a first core ring 414a with a generally inverted "L" shape. The first core ring 414a is connected to the connecting portion 394 of the outer rotor 374 by a suitable mechanism such as a fastener 415 or other suitable joining mechanism. The core 414 has a second core ring 414b with a generally backward "C" shape. The second core ring 414b is connected to the first arm portion 380 of the outer rotor 374 by a suitable mechanism such as brazing, welding, or other suitable joining mechanism. The core 414 has a separator ring 414c disposed axially between the first core ring 414a and the second core ring 414b. The core rings 414a,414b and separator ring 414c are annular and generally circular in shape. The core rings 414a,414b are made of magnetically permeable materials such as low carbon steel, powdered iron, or other suitable iron alloys. The separator ring 414c is made of a non-magnetic material such as stainless steel, aluminum, or other suitable material. The core 414 is made into an integral structure by joining all the rings by a suitable mechanism such as brazing, welding, or other suitable joining mechanism. It should also be appreciated that, in this embodiment, the core 414 and coil 412 rotate.

The magneto-rheological fluid coupling 322 further includes a magneto-rheological (MR) fluid 418 disposed in the two gaps 420 formed in the space 390 between the outer rotor 374 and the inner rotor 352. The magneto-rheological fluid coupling 322 includes a seal 421 disposed between the flange portion 386 and arm portion 384 of the outer rotor 374.

The magneto-rheological fluid coupling 322 includes at least one, preferably a plurality of brushes 423, which are connected by a suitable mechanism such as wires (not shown) to the current amplifier 28. The magneto-rheological fluid coupling 322 includes at least one, preferably a plurality of slip rings 425 connected to the first base portion 376. The slip rings 425 are connected to the first base portion 376 by a suitable mechanism such as brazing, welding, or other suitable joining mechanism. The coil 412 is connected by a suitable mechanism such as wires 425a extending through the first base portion 376 to the slip rings 425. The operation of the magneto-rheological fluid coupling 322 is similar to the magneto-rheological fluid coupling 22. It should be appreciated that, in the embodiment illustrated, the magneto-rheological fluid coupling 322 has a rotating coil 412 and the brushes 423 and slip rings 425 supply electrical power to the coil 412. It should also be appreciated that the brushes 423 rotate relative to the slip rings 425. It should further be appreciated that, in another embodiment, the coil 412 may be attached to the slip rings 425.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A power steering system for a vehicle comprising:
a power steering gear;
a hydraulic pump connected to said power steering gear and having a pump housing;
a pulley;
a fluid coupling packaged radially within said pulley for receiving drive power from an engine of the vehicle for driving said hydraulic pump; wherein a portion of said fluid coupling is fixed to said pump housing such that said fluid coupling and hydraulic pump are integrated as a pump assembly;
an electronic controller operable to provide a variable control signal based on received input; and
a power electronic converter operable to receive said variable control signal and to energize said fluid coupling in response to said variable control signal to vary torque transmitted via said fluid coupling.

2. A power steering system of claim 1, wherein said power electronic converter is one of a current amplifier and a voltage amplifier.

3. A power steering system of claim 2, wherein said power electronic converter is a pulse width modulated device.

4. The power steering system of claim 1, wherein said electronic controller and said power electronic converter are integrated in an electronic control module.

5. The power steering system of claim 1, further comprising:
a battery connected to said power electronic converter to provide power to said power electronic converter.

6. The power steering system of claim 1, wherein said fluid coupling is a magneto-rheological fluid coupling, and said pump assembly is a magneto-electrohydraulic pump assembly.

7. The power steering system of claim 1, further comprising:
an intermediate shaft connecting said fluid coupling with said hydraulic pump.

8. The power steering system of claim 1, wherein said fluid coupling includes a housing disposed about and spaced from said intermediate shaft and having a cavity therein.

9. The power steering system of claim 7, wherein said fluid coupling includes at least one drive member disposed in said cavity and operatively connected to the drive shaft; and wherein said fluid coupling includes at least one driven member disposed in said cavity and operatively connected to said intermediate shaft.

10. The power steering system of claim 9, wherein said fluid coupling includes a coil disposed in said cavity and about said drive member and said driven member and electrically connected to said power electronic converter.

11. The power steering system of claim 10, further comprising:
a magneto-rheological fluid disposed in said cavity between said drive member and said driven member.

12. The power steering system of claim 1, further comprising:
a steering wheel sensor operatively connected to a steering wheel and to said electronic controller to send said input to said electronic controller.

13. A power steering system comprising:
a power steering gear;
a power steering pump assembly including a hydraulic pump connected to said power steering gear and having a pump housing, and further including a fluid coupling integrally connected to said pump housing such that said power steering pump assembly is a module, said fluid coupling having a drive member adapted to receive power from a drive shaft of an engine at an outer circumference thereof, said fluid coupling including a coil and a driven member said driven member being operatively connected to said hydraulic pump for driving said pump;

a power electronic converter electrically connected to said coil of said fluid coupling to provide power to said coil of said fluid coupling; and an electronic controller electrically connected to said power electronic converter to provide a variable control signal to said power electronic converter, said power provided by said power electronic converter to said coil varying in response to said variable control signal.

14. The power steering system of claim 13, further comprising:

an intermediate shaft spaced radially inward of said drive member and said driven member and connected to both said driven member and said hydraulic pump.

15. The power steering system of claim 14, wherein said fluid coupling is disposed radially about said intermediate shaft and has a cavity therein.

16. The power steering system of claim 15, wherein said coil is disposed in said cavity and about said drive member and said driven member.

17. The power steering system of claim 16, further comprising:

a magneto-rheological fluid disposed in said cavity between said drive member and said driven member.

18. A power steering system comprising:

a power steering gear;

a power steering pump connected to said power steering gear and having a pump housing;

an intermediate shaft connected to said power steering pump;

a pulley adapted for receiving driving power from an engine drive shaft;

a magneto-rheological fluid coupling connected to said intermediate shaft, packaged radially inward of said pulley and adapted for receiving driving power from said drive shaft via said pulley; wherein a portion of said fluid coupling is fixed to said pump housing to form a magneto-rheological pump assembly module;

a power electronic converter electrically connected to said magneto-rheological fluid coupling to provide power to said magneto-rheological fluid coupling; and an electronic controller in signal communication with said power electronic converter and operable to provide a control signal to said power electronic converter to vary torque provided to said power steering pump by said magneto-rheological fluid coupling.

* * * * *